United States Patent [19]
Cliff

[11] 3,721,421

[45] March 20, 1973

[54] THERMAL ACTUATORS

[75] Inventor: Thomas Charles Cliff, Sunbury-on-Thames, England

[73] Assignee: United Gas Industries Limited, London, England

[22] Filed: Nov. 12, 1970

[21] Appl. No.: 88,706

[52] U.S. Cl. ........................................251/11, 60/23
[51] Int. Cl. ............................F03g 7/06, F16k 31/04
[58] Field of Search ............................251/11; 60/23

[56] References Cited

UNITED STATES PATENTS 2,285,913  6/1942  Derrah ....................................60/23
2,322,762  6/1943  Malone ..................................251/11
3,109,454  11/1963  Whitlock et al. ..................251/11 X

FOREIGN PATENTS OR APPLICATIONS 319,714  0/1934  Italy ......................................251/11

Primary Examiner—Arnold Rosenthal
Attorney—Norris & Bateman

[57] ABSTRACT

A thermal actuator comprising a sealed container of thermally-conducting material containing a liquid and including a thermally responsive element and an actuating member; a heater in heat exchange relationship with the container; and a heat sink.

9 Claims, 2 Drawing Figures

PATENTED MAR 20 1973
3,721,421
FIG.1.
FIG.2.
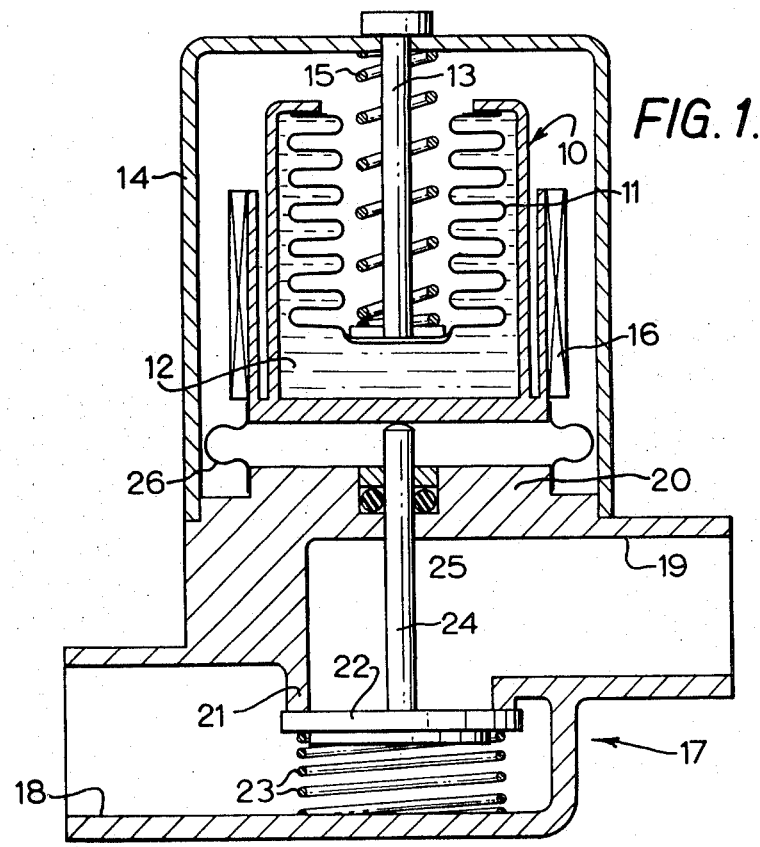
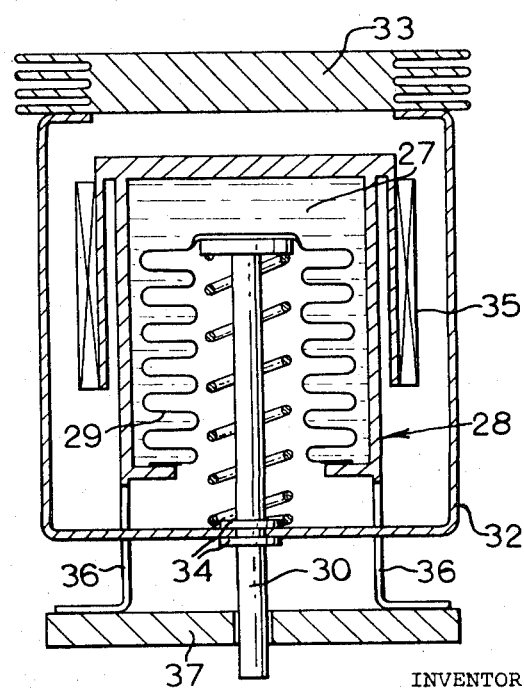
INVENTOR
THOMAS CHARLES CLIFF
By — NORRIS & BATEMAN

THERMAL ACTUATORS

This invention relates to thermal actuators and more particularly to thermal actuators for operating valves of the type commonly used to control the flow of water within a central heating system, where the valve is operated by means of the thermal expansion or contraction of a substance contained within a flexible or partially flexible container of the actuator, said container being heated by means of an electrically energized heater in heat exchange relationship with the container, the opening and closing of the valve being determined by the energization of the said heater by switching the electrical supply to the heater.

An actuator suitable for controlling such a valve may comprise a sealed container of brass or other good thermally conducting material, one part of the container may be a flexible diaphragm or bellows, and the container may be filled or partially filled with liquid. A change of temperature of the container is made to result in deflection of the flexible component due to the resulting change in the pressure within the container. This deflection may be mechanically transmitted to the valve mechanism so that a change of temperature of the container results in the opening or closing of the valve. The temperature at which such movement occurs is arranged to be substantially above the ambient temperature that may prevail so that movement will only result from the application of heat to the container from an additional source which may be an electrically energized heater in heat exchange relationship with the container.

A requirement for such a valve is that it should open and close quickly on energization or deenergisation. Fast operation can be obtained simply by providing a relatively high wattage heater, but this would result in the container attaining a high temperature, and operation in the opposite direction would be slow due to the long time required for the container to cool. Existing actuators overcome this problem by causing the movement of the actuator to operate a switch when the extreme of the required movement is reached, the switch being arranged to isolate the heater or a part of it so that the movement of the actuator effectively controls its own temperature by means of the switching action. A disadvantage with such a system is that as the physical size of such actuators is small, the rate of cycling on and off is frequent, and problems such as wear on the contacts of the switch and radio interference from their operation become troublesome.

The present invention aims to overcome the disadvantage of existing actuators.

Accordingly, the present invention provides a thermal actuator comprising a sealed container made of thermally conducting material, containing a substance and including a thermally responsive element, and an actuating member; a heater in heat exchange relationship with the container and a heat sink; the arrangement being such that when the temperature in the container has been raised by the heater to a predetermined value, the pressure in said container is effective to cause the thermally responsive element to move the actuating member to an operative position, said actuating member also being effective to establish contact between the container and heat sink whereby the heat energy which is excess to that required to hold the actuating member in its operative position can be dissipated.

The invention will be described further, by way of example, with reference to the accompanying drawings in which:

FIG. 1 is a sectional view of a first embodiment of the thermal actuator of the invention wherein the container is arranged to move onto the heat sink; and FIG. 2 is a sectional view of a second embodiment of the invention wherein the heat sink is arranged to move onto the container.

Referring to the drawings, FIG. 1 shows a thermal actuator constructed in accordance with the invention and comprising a sealed container 10 made of a thermally conducting material. The container 10 includes a thermally responsive element in the form of a flexible metal bellows 11 which serves to confine a suitable liquid 12 in the container 10. The lower end of the bellows 11 is connected by a rod 13 to the upper end of a thermal insulator cap 14 which thermally isolates the container 10 from surrounding components. A coil spring 15 maintains the bellows 11 and cap 14 in spaced relationship to each other. An electrical heater coil 16 surrounds the container 10 and is arranged to be energized from an appropriate source (not shown).

The actuator is provided with a main valve body 17 which is formed with a fluid inlet 18 and a fluid outlet 19 and also includes a heat sink 20 adjacent the lower end of the container 10. A valve seat 21 is formed in the body 17, a valve head 22 being provided to isolate the inlet 18 from the outlet 19 by co-operating with such seat 21. The valve head 22 is movable against the action of a coil spring 23 by means of an actuating rod 24 which is slidably mounted in the heat sink 20. The upper end of the rod 24 bears against the lower end of the container 10 and also a seal 25 is provided to co-operate with the rod 24 to ensure a fluid-tight fit with the outlet 19. The adjacent or mating surfaces of the container 10 and the heat sink 20 are enclosed by a flexible casing 26 to prevent the ingress of dirt or other foreign matter which could interfere with the thermal contact between the container and the heat sink.

In use, the valve head 22 can be made to move away from the valve seat 21, thereby connecting the inlet 18 and outlet 19, simply by energizing the electrical heating coil 16. The heat causes the liquid 12 to expand thereby compressing the bellows 11 until the lower end of the container 10 is in contact with the heat sink 20. If the supply to the heating coil is cut off, the residual heat in the container 10 is quickly dissipated by the heat sink 20 and any liquid which is flowing thereover. Thus the liquid 12 is also cooled quickly which expands the bellows 11 and allows the spring 23 to close the valve head 22 onto the seat 21.

It will be seen that the above described arrangement avoids electrical switching and its associated problems and reduces the risk of failure in service.

Such a system wherein the container is arranged to move onto the heat sink is of advantage in the case of a valve controlling water where the maximum temperature of the water is known. In such a case, water contained within the valve contributes to the effect of the heat sink and thus the thermal dissipation of the valve and water compared with the maximum electrical heat energy available may be considered infinite, and the practical limitation to the heat that may be dissipated is limited only by the conduction of the components concerned.

However, a further embodiment of the actuator of the invention is envisaged wherein the heat sink is movable onto the container and this construction is illustrated in FIG. 2. In FIG. 2, a liquid 27 is confined by a sealed container 28 and a flexible metal bellows 29. The upper end of the bellows 29 is maintained in contact with an actuating rod 30 by one end of a coil spring 31 the other end of which abuts a mount 32 for a heat sink 33. The mount 32 is located on the rod 30 by means of washers 34. The container 28 is provided with an electrical heating coil 35 and is mounted by struts 36 on a thermal insulator 37.

This actuator may be used to operate a valve (not shown) in a similar manner to the first embodiment the only difference being that the heat sink 33 does not have the added benefit of the thermal dissipation of any liquid flowing through the valve.

Although the present invention is of particular utility when used in connection with valves, it should be understood that the invention is not restricted to this use and is equally suitable for other applications in which an actuator of the invention may be used. Also, the actuator is not limited to the case where the bellows confines a liquid in the container and instead of just a liquid the bellows may confine a liquid and a vapor or even a suitable wax.

I claim:

1. A thermal actuator comprising a sealed container mainly composed of thermally conductive material having a first wall at one end and a second wall at the opposite end movable relative to said first wall, said second wall including a flexible bellows section in the container, said container enclosing a substance that expands when heated, means for heating said container, a movable actuation member operatively connected to one of said end walls, a heat sink disposed adjacent said first end wall, said heat sink and said entire container being mounted for relative movement and said first end wall and said heat sink being out of contact when said container is not heated, and means including said bellows section to move said actuation member to an operative position when said container is heated and said substance expands and to effect relative movement and contact of said container and heat sink so that said first end wall of said container and said heat sink are brought into heat exchange contact for dissipation of excess heat from the container while said actuation member is held in said operative position.

2. An actuator as claimed in claim 1, wherein the container is mounted to move onto the heat sink and the actuating member is connected to operate a fluid flow control valve.

3. An actuator as claimed in claim 1, wherein the heating means is in the form of an electrical heating coil arranged to be energized from an appropriate source.

4. An actuator as claimed in claim 2, wherein the valve comprises a main valve body which is formed with an inlet and an outlet and includes the heat sink which is disposed adjacent the container.

5. An actuator as claimed in claim 4, wherein the main valve body is formed with a valve seat which is arranged to co-operate with a valve head connected to the actuating member and biased against the seat, the actuating member slidably extending through the heat sink to contact the adjacent end of the container.

6. An actuator as claimed in claim 5, wherein the adjacent surfaces of the container and the heat sink are enclosed by a flexible casing to prevent the ingress of dirt or other foreign matter which could interfere with heat exchange contact between the container and the heat sink.

7. An actuator as claimed in claim 1, wherein the heat sink is arranged to move onto the container.

8. An actuator as claimed in claim 7, wherein the bellows section has a movable end connected by the actuating member to a mount of the heat sink and the container is mounted by struts on a thermal insulator.

9. An actuator as claimed in claim 8, wherein the heating means is in the form of an electrical heating coil energizable from an appropriate supply.

* * * * *